2,980,590
PRODUCTION OF LYSINE

Harry Pearson Broquist, Woodcliff Lake, N.J., and Alberta Marie Albrecht and Arthur Van Buren Stiffey, Pearl River, N.Y., assignors to American Cyanamid Company, New York, N.Y., a corporation of Maine No Drawing. Filed Aug. 19, 1957, Ser. No. 679,059

7 Claims. (Cl. 195—29)

This invention relates to l-lysine, an essential amino acid, and to methods of producing lysine. More particularly, the invention relates to the production of l-lysine by a process in which alpha-aminoadipic acid is used as a precursor of l-lysine.

A number of foods, particularly those containing cereal grains of products derived therefrom, are deficient in the essential amino acid l-lysine. Essential amino acids are those which are required by animals for their proper maintenance and growth. The animal body is not able to synthesize these amino acids which are necessary for the formation of animal protein. There are a number of essential amino acids; and, fortunately, most protein matter is made up of a balance of these so that when this protein is consumed, there is a sufficient supply of the proper amino acids after digestion to reconstitute the protein matter necessary for the animal's growth. Although most protein matter of animal origin contains an adequate balance of essential amino acids and while some protein matter of vegetable origin is adequate for proper growth of animals, there is a very large number of food stuffs which are lacking in protein which will yield all of the essential amino acids. This is particularly true of proteins derived from cereal grains such as rice, wheat and corn. In recent years, it has become apparent that many foods consumed by animals, which term includes man, need to be supplemented with l-lysine in order to give them a proper balance of essential amino acids whereby these foods can be more effective in the maintenance and growth of the animal body.

Although l-lysine can be produced synthetically and by fermentation processes involving bacteria, these processes are quite expensive and tend to limit the use of lysine as a food supplement. It is desirable, therefore, that a cheap method of producing l-lysine in a form suitable for addition to animal food be made available. This is accomplished by the present invention.

We have discovered that yeast cells have the ability to produce lysine.

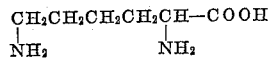

from alpha-aminoadipic acid

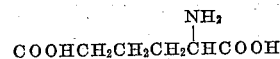

Although it is known that l-lysine can be produced by certain microorganisms using certain specific precursors, alpha-aminoadipic acid is said to be a precursor of lysine in Neurospora, we believe that we are the first to discover that the enzymes of yeasts have the ability to convert alpha-aminoadipic acid to l-lysine and in amounts far in excess of the requirements of the yeast cell for its protein content. In other words, free l-lysine can be extracted from the aqueous nutrient medium in which the cells are grown as well as from the yeast cells without the necessity of hydrolysis of the yeast protein to liberate the l-lysine. The amount of l-lysine that is produced can be very high; and since alpha-aminoadipic acid can be readily synthesized in unlimited quantities at relatively low costs, our new process provides a means of obtaining l-lysine cheaply and in unlimited quantities.

One of the most important advantages of the invention is derived from the fact that yeast has been grown on a commercial basis for many years as a source of animal food. It is not necessary, therefore, to develop any new techniques or equipment to provide l-lysine in an edible form. If desired, the entire fermentation liquor resulting from the propagation of the yeast cells in a medium containing alpha-aminoadipic acid can be simply added to animal feeds with no treatment whatsoever to increase the nutritive value of these feeds by the relatively large amounts of lysine contained in the whole fermented mash. This fermented mash may be dried and packaged and sent to wherever it may be needed. Alternatively, the yeast cells may be separated from the mash, washed and dried and used wherever yeast cells are now used as food supplements. The new yeast cells produced by the process of the present invention are particularly effective in this regard in that instead of containing only 3 to 4 percent of l-lysine, most of which is bound in a protein form, the new yeast cells produced in accordance with the process to be described hereinafter may contain as much as 20 percent of l-lysine most of which is in the form of free lysine.

Of course, if desired, the yeast cells of the present invention may be treated to release the lysine content thereof and free l-lysine in substantially pure form may be recovered therefrom for such uses as require essentially pure lysine.

Although a preferred method of practicing the invention is to add alpha-aminoadipic acid to a yeast fermentation and allow it to be converted to l-lysine by the yeast enzymes simultaneously with the production of new yeast cells, it has been found that the enzymes contained in resting yeast cells can also convert alpha-aminoadipic acid to l-lysine. All that is necessary in this embodiment of the invention is to mix alpha-aminoadipic acid with yeast cells in an aqueous suspension and allow the enzymes which are contained in the yeast cells to effect the conversion preferably while the mixture is agitated and aerated. This conversion by resting yeast cells takes place over a pH range of from 2.5 to 8.5, preferably 3.0 to 5.0, over a wider range of temperatures, for instance from 5° C. to 50° C. Substantial conversion is effected within 24 hours at room temperature, although the period of time may range from as little as one hour to forty-eight hours or more depending upon the pH, temperature, rate of aeration, agitation, and other factors.

A further embodiment of the invention which would not normally be used in the commercial production of lysine is to rupture the yeast cells by chemical or physical means to liberate the enzymes contained therein and add alpha-aminoadipic acid so that it may be converted by the enzymes in the solution to the desired l-lysine.

While we have indicated above that alpha-aminoadipic acid is converted to l-lysine by the action of yeast enzymes, we wish to point out that the mechanism of the conversion is not definitely known. In fact, some mechanism other than enzyme action may be involved. On the basis of experimental evidence, however, it appears that the conversion is a result of enzymes, probably more than one, and by several stages. We do not wish, therefore, to be bound by any theory. The facts are that alpha-aminoadipic acid is converted to l-ylsine by a biosynthesis in excellent yields by the action of yeast cells.

EXAMPLE I

A synthetic medium was prepared with the following components:

Table I

| Ingredient | Synthetic Medium— Grams/liter final strength medium |
| --- | --- |
| Dextrose | 50 |
| $KH_2PO_4$ | 0.3 |
| $MgSO_4$ | 0.1 |
| Aspartic Acid | 0.2 |
| Glutamic Acid | 0.2 |
| $(NH_4)_2SO_4$ | 3.8 |
| Sodium Citrate Buffer [1] | 50 ml. |
| Vitamin Solution [2] | 10 ml. |
| Water to 1 liter. | |

[1] Sodium Citrate Buffer:
  100 grams sodium citrate.
  20 grams citric acid.
  water to 1 liter.
[2] Vitamin Solution:
  Thiamine—20.0 mg.
  Biotin—0.2 mg.
  Pyridoxine—20.0 mg.
  Calcium pantothenate—20.0 mg.
  Inositol—200.0 mg.
  Nicotinic acid—20.0 mg.
  Water to 40 ml.

Portions of the synthetic medium were placed in glass vessels, some containing in addition varying amounts of alpha-aminoadipic acid (also referred to herein as AAA). These fermentation vessels were plugged with cotton and sterilized in an autoclave for 15 minutes at 15 pounds steam pressure. Malt-agar slants carrying 24- to 28-hour cultures of growing yeast cells were suspended in 10 milliliters of sterile physiological saline. This suspension was used to inoculate the sterile vessels which were then incubated for 72 hours at about 24° C. on a reciprocal shaker. At the end of the fermentation period, the fermented liquor was steamed for ten minutes in an open autoclave to stop the fermentation and release the free l-lysine in the cells. The liquid was centrifuged and the supernatant liquor recovered and analyzed for its l-lysine content by a microbiological method described by Steel et al. in the Journal of Biological Chemistry, 177, page 533 (1949). The results of this series of fermentations are shown in the table below.

Another series of fermentation vessels containing a medium composed of 50 grams of dextrose, 3.8 grams of ammonium sulfate, and 50 milliliters of corn steep liquor (50 percent solids dry basis) per liter and adjusted to pH 5.3 with phosphoric acid was prepared and fermentations were run in the same manner. The results are also shown in the following table. The designation CSL refers to the cornsteep liquor medium described above, and SYN refers to the synthetic medium.

Table II

| Yeast | Medium | dl-AAA, mg./ml. | L-lysine mg./ml. |
| --- | --- | --- | --- |
| Red Star Bakers' Yeast: | | | |
| Saccharomyces cerevisiae | CSL | None | 0.20 |
| Do | CSL | 5.0 | 1.15 |
| Fleischmann's Bakers' Yeast: | | | |
| Saccharomyces cerevisiae | CSL | None | 0.22 |
| Do | CSL | 5.0 | 1.85 |
| Saccharomyces cerevisiae Y-17 | CSL | None | 0.14 |
| Do | CSL | 2.0 | 0.50 |
| Do | CSL | 10.0 | 2.71 |
| Saccharomyces cerevisiae Y-87 | CSL | None | 0.19 |
| Do | CSL | 2.0 | 0.75 |
| Do | CSL | 10.0 | 2.66 |
| Saccharomyces tournier | CSL | None | 0.06 |
| Do | CSL | 1.0 | 0.15 |
| Do | CSL | 3.0 | 0.30 |
| Saccharomyces Y-9 | CSL | None | 0.22 |
| Do | CSL | 2.0 | 0.58 |
| Do | CSL | 10.0 | 3.12 |
| Saccharomyces ellipsoideus | SYN | None | 0.010 |
| Do | SYN | 1.0 | 0.027 |
| Saccharomyces thermantitonium | SYN | None | 0.004 |
| Do | SYN | 1.0 | 0.014 |
| Torulopsis utilis Y-900 | CSL | None | 0.48 |
| Do | CSL | 5.0 | 1.75 |
| Torulopsis utilis Y-1082 | CSL | None | 0.39 |
| Do | CSL | 5.0 | 1.26 |
| Torulopsis cremoris | SYN | None | 0.07 |
| Do | SYN | 2.0 | 0.49 |
| Torulopsis sphaerica | SYN | None | 0.04 |
| Do | SYN | 2.0 | 0.19 |
| Torulopsis pulcherrima | SYN | None | 0.06 |
| Do | SYN | 2.0 | 0.35 |
| Candida tenius | SYN | None | 0.04 |
| Do | SYN | 1.0 | 0.11 |
| Kloeckeria brevis | SYN | None | 0.009 |
| Do | SYN | 1.0 | 0.021 |

EXAMPLE II

A fermentation medium containing 0.4 percent yeast extract, 0.4 percent glucose, 1.0 percent malt extract, and water was prepared and sterilized. To one group of fermentation flasks was added sufficient alpha-aminoadipic acid to provide 5 milligrams per milliliter of medium. The flasks were then inoculated with cultures of growing yeast cells and allowed to grow in the medium for 72 hours with constant agitation at 24° C. At the end of this time, the contents of the flask were heated to stop fermentation and rupture the yeast cells and liberate free lysine. The supernatant liquid was then examined for l-lysine with the following results:

Table III

| Yeast | No Precursor | AAA, 5 mg./ml. |
| --- | --- | --- |
| Endomyces sp. (unidentified) | 119 | 190 |
| Eremascus fertilis | 180 | 279 |
| Nematospora phaseoli | 70 | 214 |
| Endomycopsis fibuliger | 63 | 356 |
| Saccharomycodes ludwigii | 52 | 278 |
| Hanseniaspora valbyensis | 199 | 220 |
| Schizosaccharomyces pombe | 143 | 463 |
| Schwanniomyces occidentalis | 57 | 542 |
| Debaryomyces membranefaciens | 210 | 278 |
| Lipomyces starkeyi | 204 | 254 |

In a similar demonstration of the ability of yeast cells to convert alpha-aminoadipic acid to l-lysine, a medium was made up of 2 percent molasses, 3 percent malt extract and water. To one series of fermentation flasks, alpha-aminoadipic acid was added in an amount to 5 milligrams per liter of medium. The fermentation was conducted as above and the supernatant liquid analyzed for l-lysine with the following results:

Table IV

| Yeast | No Precursor | AAA, mg./ml. |
|---|---|---|
| Endomyces sp. | 58 | 74 |
| Endomycopsis fibuliger | 43 | 253 |
| Saccharomycodes ludwigii | 62 | 292 |
| Hanseniaspora valbyensis | 145 | 292 |
| Schizosaccharomyces pombe | 58 | 414 |
| Schwanniomyces occidentalis | 60 | 369 |
| Debaryomyces membranefaciens | 67 | 76 |

EXAMPLE III

In addition to the foregoing species, it has been found qualitatively that alpha-aminoadipic acid can be converted to lysine by the following yeasts:

> Saccharomyces pastorianus
> Saccharomyces exiguus
> Saccharomyces ilicis
> Saccharomyces monacensis
> Saccharomyces carlsbergensis
> Saccharomyces albus
> Saccharomyces sake
> Saccharomyces turbidans
> Saccharomyces fragilis
> Saccharomyces chodati
> Saccharomyces aromaticus
> Saccharomyces lactis
> Saccharomyces behrensianus
> Saccharomyces spiritus-vini
> Torulopsis lactis
> Zygosaccharomyces fragilis
> Candida rugosa
> Candida flareri
> Candida lipolytica
> Candida pulcherrima
> Candida reukaufii
> Candida tenuis
> Nematospora phaseoli
> Sporobolomyces sp.
> Dematium sp.

In addition to these specific yeasts, a large number of unidentified yeasts were also able to convert alpha-aminoadipic acid to l-lysine. From these results, it appears that practically all yeasts have the ability to effect this conversion under favorable conditions.

EXAMPLE IV

The previous examples illustrate the conversion of alpha-aminoadipic acid to l-lysine by a large number of different species of yeast cells of genera of the Endomycetaceae and Cryptococcaceae families while they are growing in a nutrient medium. Additional studies that we have made show that alpha-aminoadipic acid can be converted to l-lysine by resting cells, it not being necessary to add the alpha aminoadipic acid to the fermenting cells.

In one such experiment, a species of Saccharomyces Y-9 was grown in a suitable nutrient medium and the yeast cells were harvested by centrifugation, washed with distilled water twice and finally suspended in 0.1 molar citrate buffer at a pH of 5.2, the suspension containing 5 percent by weight of yeast cells (dry weight). To each of a series of beakers was added 10 milligrams of ammonium sulfate, 50 milligrams of glucose, 0.3 milligram of pyridoxal and a quantity of suspended yeast cells as prepared above. To some of the beakers was also added 5 milligrams of dl-alpha-aminoadipic acid and the volume was made up to 3 milliliters with water and adjusted to pH 5.2 with the citrate buffer. The beakers were then placed on a shaker and incubated at 30° C. with shaking. Samples were removed at the end of 30 minutes and three hours and diluted to 5 milliliters with water and steamed for ten minutes to stop fermentation and rupture the yeast cells to liberate free l-lysine. The liquid was then centrifuged and the l-lysine content determined by microbiological assay. The results of this series of demonstrations is shown in the following table.

Table V

| Flask | Yeast Cells (Dry Weight) | dl-AAA, mg./Flask | Incubation Time, Hours | Lysine, γ/Flask |
|---|---|---|---|---|
| 1 | 16.8 | | 0.5 | 85 |
| 2 | 16.8 | 5 | 0.5 | 260 |
| 3 | 50.4 | | 0.5 | 285 |
| 4 | 50.4 | 5 | 0.5 | 820 |
| 5 | 16.8 | 5 | 3 | 865 |
| 6 | 50.4 | 5 | 3 | 1005 |

EXAMPLE V

In other experiments, it has been shown that the addition of the precursor does not substantially increase the number or weight of the yeast cells that are formed in a given fermentation nor does the presence of the precursor substantially increase the l-lysine content of the protein of the yeast cell. On the other hand, the precursor does greatly increase the presence of free lysine in the yeast cell and also increases the amount of free lysine in the fermentation medium outside of the yeast cells.

In one such experiment, 15 milliliters of the corn steep liquor fermentation medium described in Example I was fermented with a culture of Saccharomyces Y-9 as used hereinabove. Some of the flasks contained 2 milligrams per milliliter of dl-aminoadipic acid, others contained 10 milligrams per milliliter of aminoadipic acid and others contained none of this precursor. The yeast cells were allowed to aerobically ferment the medium at room temperature on a reciprocal shaker. Samples from the flasks were removed after 24-, 48-, and 72-hour periods. The supernatant liquor was examined for free l-lysine content. Also, the fermentation liquor and the yeast cells were steamed to liberate the free lysine of the cells and the supernatant liquor was analyzed for l-lysine. The results of this series of experiments is shown in the following table.

Table VI

| dl-AAA, mg./ml. | Lysine, γ/ml. Incubation Time, Hours | | | | | |
|---|---|---|---|---|---|---|
| | 24 | | 48 | | 72 | |
| | Total | Extra Cellular | Total | Extra Cellular | Total | Extra Cellular |
| None | 96 | 48 | 118 | 58 | 216 | 84 |
| 2 | 320 | 84 | 552 | 106 | 580 | 118 |
| 10 | 1,260 | 403 | 2,580 | 140 | 3,120 | 160 |

As will be seen from the above, there is a substantial amount of free l-lysine outside of the yeast cells in the fermentation medium and, of course, a still larger amount of free lysine within the cell structure.

Although one of the principal advantages of the present invention lies in the fact that the whole fermented mash from the fermentation may be added directly, with drying if desired, to animal feeds to bring their lysine content into balance or the separated yeast cells may be used to supplement lysine-deficient foods for man and beast, it may be desirable to recover essentially pure lysine from the fermented product. The l-lysine content of the fermented liquor may be recovered in known manner. An effective way involves the use of ion-exchange resins which have an affinity for amino acids. Aqueous liquors containing l-lysine, whether it be the supernatant liquor from the fermentor or hydrolyzed yeast cells containing free lysine, is adsorbed on an appropriate ion-exchange resin and thereafter eluted and the eluate refined to obtain essentially pure l-lysine.

The yeast cells which have been in contact with alpha-aminoadipic acid are characterized by having an extremely high content of l-lysine, 10 percent and more, and appear to be a new form of yeast because of this high free l-lysine. This property makes these yeast cells of particular value in supplementing low lysine foods derived from such cereals as corn, wheat, and rice. For instance, wheat flour is low in l-lysine and the addition of amounts of lysine up to about 0.4 percent by weight has been recommended. This is easily accomplished by adding approximately 4 percent by weight, dry basis, of yeast cells containing 10 percent free lysine. Of course, when the yeast cells contain larger amounts as have been indicated hereinabove, the amount of yeast that need be added may be considerably reduced.

The amount of free lysine in the yeast cells can be governed by the amount of the alpha-aminoadipic acid that is added to the fermentation which produced the yeast cells. Larger amounts of l-lysine added to the fermentation—that is, amounts up to 2 percent—result in higher contents of free l-lysine in the yeast cells and in the fermentation medium from where it may be isolated independently of the free l-lysine and protein-bound lysine in the yeast cells. Our invention, therefore, contemplates the use of amounts of precursor as high as 2 percent by weight in the process.

We claim:

1. A method of preparing free l-lysine which comprises the step of subjecting alpha-aminoadipic acid in amounts from 1 to 10 mg./ml. to the action of the enzymes of yeast at a pH from 3.0 to 5.0 and a temperature from 5° C. to 50° C.

2. A method of preparing free l-lysine which comprises the step of bringing alpha-aminoadipic acid in amounts from 1 to 10 mg./ml. into contact with yeast cells at a pH of 3.0 to 5.0 and a temperature of 5° C. to 50° C. for a period of at least one hour whereby conversion of alpha-aminoadipic acid to free l-lysine takes place.

3. A method of preparing free l-lysine which comprises the step of adding alpha-aminoadipic acid in amounts from 1 to 10 mg./ml. to an aerobic yeast fermentation at a pH from 3.0 to 5.0 and a temperature of from 5° C. to 50° C. whereby conversion of the alpha-aminoadipic acid to free l-lysine takes place.

4. A method according to claim 2 in which the yeast cells are of the genus Saccharomyces.

5. A method according to claim 4 in which the Saccharomyces is *Saccharomyces cerevisiae*.

6. A method according to claim 2 in which the yeast cells are of the genus Torulopsis.

7. A method according to claim 6 in which the species of Torulopsis is *Torulopsis utilis*.

References Cited in the file of this patent

UNITED STATES PATENTS 2,313,275     Schopmeyer     Mar. 9, 1943

OTHER REFERENCES

Advances in Enzymology, vol. 16, 1955, pages 295–304 by F. F. Nord, Interscience Publishers Inc., New York.

Annual Review of Biochemistry, vol. 24 (1955), pages 284–285.

J. Biol. Chem., vol. 213 (1955), pages 355–363.

Biochemistry of Amino Acids, by Meister Academic Press Inc., New York (February 1947), pages 359–361.